United States Patent
Burnham et al.

[11] Patent Number: 5,853,450
[45] Date of Patent: Dec. 29, 1998

[54] METHOD FOR TREATING BIOORGANIC AND WASTEWATER SLUDGES

[75] Inventors: Jeffrey C. Burnham, Naples, Fla.; Frederick H. Kurtz, Matawan, N.J.

[73] Assignee: Medical College of Ohio, Toledo, Ohio

[21] Appl. No.: 922,845

[22] Filed: Sep. 3, 1997

Related U.S. Application Data

[63] Continuation of Ser. No. 532,273, Sep. 22, 1995, abandoned.

[51] Int. Cl.⁶ .................................................. C02F 11/16
[52] U.S. Cl. .......................... 71/9; 71/13; 71/22; 71/23; 210/609; 210/613; 210/631; 210/764; 210/916; 405/128
[58] Field of Search ............................ 71/9, 12, 13, 21, 71/22, 63, 23; 210/609, 613, 631, 710, 713, 749, 752, 764, 667, 916; 405/128, 129

[56] References Cited

U.S. PATENT DOCUMENTS

| | | | |
|---|---|---|---|
| 4,781,842 | 11/1988 | Nicholson | 210/751 |
| 4,902,431 | 2/1990 | Nicholson et al. | 210/751 |
| 5,013,458 | 5/1991 | Christy et al. | 210/751 |
| 5,135,664 | 8/1992 | Burnham | 210/751 |
| 5,275,733 | 1/1994 | Burnham | 210/609 |
| 5,417,861 | 5/1995 | Burnham | 210/609 |
| 5,422,015 | 6/1995 | Angell et al. | 210/751 |
| 5,435,923 | 7/1995 | Girovich | 210/609 |
| 5,554,279 | 9/1996 | Christy | 210/149 |

*Primary Examiner*—Peter A. Hruskoci
*Attorney, Agent, or Firm*—Barnes, Kisselle, Raisch, Choate, Whittemore & Hulbert

[57] ABSTRACT

The method of treating wastewater or bioorganic sludges containing odor, animal viruses, pathogenic bacteria, and parasites to produce a bioactive but stabilized product that is useful as a soil substitute or as a fertilizer which can be applied directly to lands which consists essentially of the following steps: mixing said sludge with at least one alkaline material, wherein the amount of added material mixed with said sludge is sufficient to raise the pH of said mixture to pH 12, and raise the conductivity to disinfect and stabilize the sludge, and adding green waste at different process locations so that a biological action occurs converting the greenwaste into a soil-like granular product with improved odor over that of the treated municipal sludge alone or a composted greenwaste alone.

11 Claims, 5 Drawing Sheets

Relationship of Bacterial Growth to Chemical and Biochemical Parameters in the product of this invention maintained at greater than 55% solids

METHOD FOR TREATING BIOORGANIC AND WASTEWATER SLUDGES

This application is a continuation of application Ser. No. 08/532,273 filed Sep. 22, 1995, now abandoned.

This invention relates to treatment of bioorganic and/or waste water sludge in coordination with the accelerated composting of green wastes.

DEFINITIONS

1. Process to Significantly Reduce Pathogens (PSRP) (Established CFR 257, Sep. 13, 1979)

PSRP is the minimum disinfection and stabilization requirement of U.S. Environmental Protection Agency. Processes so classified, i.e., aerobic digestion, anaerobic digestion, lime stabilization (pH>12 for two hours), produce sludges which may be land filled or land applied on non-food chain crops with stringent public access restrictions and grazing restrictions. Such processes must demonstrate ability to reduce pathogen concentrations by 90%. As set forth in the specification of the U.S. Pat. No. 4,902,431, in a Nov. 6, 1985 memorandum, the EPA indicated that to qualify a process as a PSRP one must demonstrate that the process reduces animal viruses by one log and pathogenic bacterial densities by at least two logs and must reduce the vector attractiveness such that vectors, like flies or rats, are not attracted to the sludge.

More recently, the USEPA has adopted a Class B regulation to replace the PSRP. Although the impact of the Class B regulations is to achieve a similar microbial content as specified in the above paragraph there are three alternatives requirements for demonstrating the achievement of this pathogen reduction, but basically, the fecal coliform density in the treated sludge must be 2 million colony forming units per gram total solids sewage sludge on a dry weight basis. The alternatives for reaching this standard are defined by reference to the USEPA publication EPA/625/R-92/013 which was published in December of 1992 and formed the basis of the Class B pathogen reduction rules of the 40CFR part 503 rules which were promulgated by the USEPA in early 1993.

2. Process to Further Reduce Pathogens (PFRP) (Established 40 CFR 257, Sep. 13, 1979)

PFRP is the most stringent criteria established by U.S. EPA for disinfection and stabilization of sewage sludges. Processes so classified must demonstrate the ability to reduce pathogen concentrations below detectable levels. Processes directly identified in 40 CFR 257 were compost, heat drying (>80 C.+ moisture content below 10%), and heat treatment (>180 C. for 30 minutes). Also with "add-on" processes to PSRP processing such as high heat pasteurization, the sludge must be maintained for at least 30 minutes at a minimum temperature of 70 C. in order to be deemed as Processes to Further Reduce Pathogens in 40 CFR 257.

At the time of publication of 40 CFR 257, no criteria were established for PFRP processes.

As indicated in U.S. Pat. No. 4,902,431, on Nov. 6, 1985, the EPA issued a memorandum indication that to qualify a process as PFRP one must demonstrate reduction of pathogenic bacteria, animal viruses, and parasites "below detectable limits" of one (1) plaque forming unit (PFU) per 100 ml of sludge for animal viruses; three (3) colony forming units (CFU) per 200 ml of sludge for pathogenic bacterial (Salmonella sp.); and one (1) viable egg per 100 ml of sludge for parasites (Ascaris sp.). Vector attractiveness must also be reduced for PFRP.

NOTE: PFRP regulations do not require the survival of any non-pathogenic organisms. In fact, many PFRP processes result in sterilization, i.e., the destruction of all microorganisms.

More recently, the USEPA has adopted a Class A regulation to replace the PFRP. Although the impact of the Class A regulations is to achieve the same microbial content as specified in the above paragraph there are a variety of alternatives requirements for demonstrating the achievement of this pathogen reduction. These are defined by reference to the USEPA publication EPA/625/R-92/013 which was published in December of 1992 and formed the basis of the Class A pathogen reduction rules of the 40CFR part 503 rules which were promulgated by the USEPA in early 1993.

3. Land Application

Land application is the traditional method of sludge utilization. PSRP sludges are a minimum requirement, but may only be used on secure fields with substantial restrictions. Public access is prohibited with PSRP sludges. PFRP has no restrictions.

4. Disinfection

Disinfection is the destruction of pathogens, i.e., disease causing microorganisms, to some quantitative level.

5. Stabilization

Used in two ways:

a. The ability of a process to maintain levels of disinfection by preventing pathogen regrowth.

b. The ability of a process to reduce odors and to prevent odor redevelopment.

6. Sterilization

Sterilization is the complete destruction of all microorganisms in a substance.

7. Pasteurization—Conventional definition

Pasteurization is the destruction of all pathogenic microorganisms except bacterial spores.

8. Adsorptive Material

Adsorptive material is a material capable of binding organic and inorganic substances to its surface.

9. USEPA

United States Environmental Protection Agency, ("USEPA").

10. Yard waste

Mechanically ground vegetation, wood chips, leaves and grass clippings

11. Green Waste

Any vegetative waste including yard waste or agricultural crop remains and either green or woody vegetation remains 12. Bioorganic sludge An organic sludge comprised of a material or materials selected from the group: sludges resulting from production of antimicrobials and other pharmaceutical products, bacterial fermentation sludges, sludges resulting from production of beer and wine, mushroom compost waste, paper mill sludges, sludges that contain microorganisms that have resulted from recycled organic products such as paper products, sludges resulting from the growth of microorganisms for the production of chemicals and organics, industrial sludges and byproducts resulting from the production of microbial products and foodstuffs, sludges resulting from the animal slaughter industry—particularly if these are digested or otherwise broken down by microorganisms; sludges comprised of animal manures, as in chicken or horse manure.

13. Organic sludge

A sludge derived from industrial products and byproducts that are comprised in the majority microbially degradable organic materials not of biological or microbiological origin.

This definition would include sludges comprised of recycled organic products such as recycled paper and paper products.

14. Class A wastewater sludge treatment

Sludges treated similarly as to achieve the microbial status in the PFRP definition above but as technically defined in the US 257 Part 503 rules published in February, 1993 by the USEPA.

15. Compost

A group of organic residues or a mixture of organic residues and bulking agents that have been piled, moistened, and allowed to undergo aerobic biological decomposition.

16. Composting

The process of creating a compost. To achieve the Class A or PFRP designation using the within-vessel composting method, the solid waste is maintained at operating conditions of 55 C. or greater for 3 days. Using the static aerated pile composting method, the solid waste is maintained at operating conditions of 55 C. or greater for 5 days. Using windrow composting method, the solid waste attains a temperature of 55 C. or greater for at least 15 days during the composting period. Municipal greenwaste composting operations often take three to six months or more to achieve stability.

17. Composting amendment

An ingredient in a mixture of composting raw materials included to improve the overall characteristics of the mix. Amendments often add carbon, dryness, or porosity to the mix.

18. Alkaline byproducts

Highly adsorbent alkaline materials selected from the group consisting of cement kiln dust, lime kiln dust, fluidized bed ash, lime injected multistage burner ash, fine calcium oxide, dry sulfur scrubbing residue, slag fines, pulverized calcium carbonate, Class C or Class F fly ash, alkaline gypsum, alum, calcium carbonate sludge from water purification plants or a combination thereof.

BACKGROUND OF THE INVENTION

With the alternatives for bioorganic and/or wastewater sludge processing changing because of the public awareness of the problems of sludge dumping, either in landfills or oceans, the treatment of bioorganic and/or wastewater [municipal] sludges by a sterilization or a pasteurization process is becoming increasingly common so that it is safe for exposure to the public as a product. In addition, it is becoming the practice of states and municipalities to prevent green wastes and yard wastes, especially leaves from being deposited in municipal landfills.

Under 40 CFR 257, a Process to Further Reduce Pathogens (PFRP) must be used where sewage sludge or septic tank pumping are to be applied to a land surface or are incorporated into the soil, and crops for direct human consumption are to be grown on such land within eighteen (18) months subsequent to application or incorporation. The 40 CFR 257 classifies the following PFRP processes:

Composting: Using the within-vessel composting method, the solid waste is maintained at operating conditions of 55 C. or greater for three days. Using the static aerated pile composting method, the solid waste is maintained at operating conditions of 55 C. or greater for five days. Using the windrow composting method, the solid waste attains a temperature of 55 C. or greater for at least fifteen days during the composting period. Also, during the high temperature period, there will be a minimum of five turnings of the windrow.

Heating drying: Dewatered sludge cake is dried by direct or indirect contact with hot gases, and moisture content is reduced to 10 percent or lower. Sludge particles reach temperatures will in excess of 80 C. or wet bulb temperature of the gas stream in contact with the sludge at the point where it leaves the dryer is in excess of 80 C.

Heat treatment: Liquid sludge is heated to temperatures of 180 C. for 30 minutes.

Thermophilic Aerobic Digestion: Liquid sludge is agitated with air or oxygen to maintain aerobic conditions at residence times of 10 days at 55–60 C., with a volatile solids reduction of at least 38 percent.

Other methods: Other methods of operating conditions may be acceptable if pathogens and vector attraction of the waste (volatile solids) are reduced to an extent equivalent to the reduction achieved by any of the above methods.

Any of the processes listed below, if added to the processes described in Section A above, further reduce pathogens. Because the processes listed below, on their own, do not reduce the attraction of disease vectors, they are only add-on in nature.

Beta ray irradiation: Sludge is irradiated with beta rays from an accelerator at dosages of at least 1.0 megarad at room temperature (ca. 20 C.).

Gamma ray irradiation: Sludge is irradiated with gamma rays from certain isotopes, such as $^{60}$Cobalt and $^{137}$Cesium, at dosages of at least 1.0 megarad at room temperature (ca. 20 C.).

Pasteurization: Sludge is maintained for at least 30 minutes at a minimum temperature of 70 C.

Other methods: Other methods of operating conditions may be acceptable if pathogens are reduced to an extent equivalent to the reduction achieved by any of the above add-on methods.

In U.S. Pat. Nos. 4,781,842 and 4,902,431 there is disclosed processes wherein:

wastewater sludge containing odor, animal viruses, pathogenic bacteria, and parasites is treated to provide a fertilizer for agricultural lands which can be applied directly to the lands which consists essentially of the following steps:

mixing said sludge with at least one alkaline material, wherein the amount of added material mixed with said sludge being sufficient to raise the pH of said mixture to 12 and above for at least one day;

and drying said mixture to produce a granular material, the amount of added material mixed with said sludge and the length of time of drying being sufficient to reduce significantly offensive odor of the sludge to a level that is tolerable; to reduce animal viruses therein to less than one plaque forming unit per 100 ml of said sludge; to reduce pathogenic bacterial therein no less than three colony forming units per 1 00 ml of said sludge; to reduce parasites therein to less than one viable egg per 100 ml of said sludge; to reduce vector attraction to said sludge; and to prevent significant regrowth of the pathogenic microorganisms.

In these processes, the alkaline material may comprise lime, cement kiln dust or lime kiln dust or other alkaline materials.

Other processes for treating wastewater sludge have utilized the concept of raising the pH in combination with high heat, e.g., greater than 70 C., to nearly sterilize, as contrasted to pasteurizing the sludge, thereby killing both undesirable and desirable bacteria. With these "add-on" processes usually the principal surviving microorganisms are bacterial spores. Such microbially-restricted sludges lose the significant fertility value associated with bioactivity.

When alkaline materials are added to a sludge to raise the pH, a toxicity may exist due to the high pH. When the product is used as a soil supplement in agriculture, particularly at high application rates, there is a risk of over alkalization of the soil (see FIG. 14) and burning of crops may result. In addition, a high pH (over pH 11) in the soil due to the addition of active alkaline materials containing calcium oxide or metal hydroxides can result in severe damage to microbial populations in surface soils. With most existing (traditional) alkaline technologies it has been required by the USEPA that the pH be maintained above pH 12 to prevent microbial overgrowth and instability. In fact, with the PFRP "add-on" heat processes, the pH is required by the USEPA to be maintained above 12 until the alkaline treated sludge is land applied. This requirement is based upon the recognition that when such sludges fall below pH 11 noxious odors will develop. U.S. Pat. No. 4,902,431 column 2 line 58–67 states: "In January 1979, the EPA published a Wastewater Sludge Manual (EPA 625/1-79-001) titled 'Process Design Manual for Sludge Treatment and Disposal' which states: 'Lime stabilization is a very simple process. Its principal advantages over other stabilization processes are low cost and simplicity of operation . . . lime addition does not make sludges chemically stable; if pH drops below 11.0, biological decomposition will resume producing noxious odors.'"

In addition, the high pH triggers the release of volatile ammonia nitrogen from the sludge which also is toxic and results in the loss of valuable nitrogen from the potential agricultural product. Further, the toxic nature of ammonia, i.e., to human and animal mucus membranes has been described as well as its lethal activity on microorganisms (see Meehan et al 1988 U.S. Pat. No. 4,793,927). Although having ammonia present during sludge stabilization processing is highly desirable for microbial control and for conditioning of the greenwaste to enhance its rapid breakdown, it is not desirable following treatment when the sludge product usage and exposure to the public is likely.

If these toxic stresses and the residual odor in a sludge product could be reduced upon demand, then opportunities for utilization of alkaline sludge products by the public and private sector would increase. This result would be favorable to increased emphasis on resource recovery of the value inherent in municipal sludge material. The present invention is able to accomplish such toxic stress reduction.

The process of U.S. Pat. Nos. 4,781,842; 4,902,431 requires a drying period which is usually effected by a windrowing process and results in a product that is above pH 12 and, if produced from an anaerobically digested sludge, emits significant amounts of ammonia. However the processes substantially reduce the emission of ammonia by aeration (such as windrowing) but to do so the processes are taking 3 to 10 days to prepare the product for storage or market. As evidence of health concerns over ammonia, states such as Ohio, New Jersey and California have implemented air quality standards regulating the emission of ammonia from industrial sites.

In U.S. Pat. Nos. 4,781,842, 4,902,431 and 5,275,733 Nicholson and Burnham teach the significant advantages of adding accelerated drying by aeration to alkaline treated sludges to achieve odor reduction and control. When windrows are used, this Nicholson and Burnham process commonly takes between 3 and 10 days to effect the aeration/drying. When mechanical dryers are used, as in the Burnham U.S. Pat. No. 5,275,733, the process is shortened to about 12 hours.

The Burnham U.S. Pat. No. 5,275,733 teaches that treated sludges may have an indigenous microflora established either naturally or by direct seeding as an ecologically active population in the sludge product. This microflora is critically significant to long-term sludge product stability because of its ability: a) to enhance by its own metabolism the carbonation of any residual hydroxides from the alkaline admixture or likewise the catabolism of unstable organics from the sludge; b) to reduce sludge odors and produce a soil-like odor; and c) to inhibit the regrowth of pathogenic microorganisms.

Another type of sludge that presently is causing a variety of problems to society with regard to proper disposal or use is a broad group of bioorganic sludges. These substances include organic sludges comprised of a material or materials selected from the group: sludges resulting from production of antimicrobials and other pharmaceutical products, bacterial fermentation sludges, sludges resulting from production of beer and wine, mushroom compost waste, paper mill sludges, sludges that contain microorganisms that have resulted from recycled organic products such as paper products; sludges resulting from the growth of microorganisms for the production of chemicals and organics, industrial sludges and byproducts resulting from the production of microbial products and foodstuffs, sludges resulting from the animal slaughter industry—particularly if these are digested or otherwise broken down by microorganisms, and sludges that are comprised of animal manures such as chicken or horse manure. The sludge material to be stabilized with greenwaste as per the treatment described in the present invention would also include sludges derived from industrial products and byproducts that are comprised in the majority microbially degradable organic materials not of biological or microbiological origin. This would include sludges comprised of recycled organic products such as recycled paper and paper products such as paper mill sludges. The most common disposal procedure is to landfill them thereby wasting their organic value and essentially delaying proper treatment. The second most common disposal procedure is to land apply them without further stabilization. This is significant for two reasons: one, these bioorganic sludges will usually provide an excellent substrate for anaerobic bacterial metabolism resulting in the creation of noxious odors and community problems, and two, these sludges without stabilization will create runoff problems with non-point source discharge pollution. The stabilization of sludges and greenwastes described in this invention will delay entry of the nitrogen into the ground water both avoiding contamination and allowing longer access for crops to the nitrogen in the stabilized product resulting from this invention.

This invention introduces a method to process these wastes along with bioorganic and/or wastewater sludges to produce a beneficial product for use as a soil substitute. The present invention introduces a method providing long term stability to bioorganic and/or wastewater sludges and concomitantly causes an accelerated composting of leaves and other green wastes so that a unique organic soil-like product is created unlike the alkaline stabilized sludges described in earlier patents, U.S. Pat. Nos. 4,781,842 and 4,902,431 and 5,275,733 and recent U.S. patent application Ser. No. 08/170705 filed, entitled "Process to Stabilize Bioorganic Raw or Treated Wastewater Sludge", or a green waste compost. Among the objectives of the present invention are to provide a method of treating and stabilizing bioorganic and/or wastewater sludges in coordination with the composting of leaves and other greenwaste to provide a beneficiated soil or fertilizer that has an improved odor.

SUMMARY OF THE INVENTION

In accordance with the invention, the method comprises the steps of treating and stabilizing a dewatered unprocessed sludge, i.e., raw sludge, or bioorganic sludges with an adsorbent alkaline material to effect odor reduction and accelerate the achievement of granularity and raise the pH of the sludge mixture to above pH 12, heating the sludge to at least 52 C. for 12 hours, seeding the sludge mixture, if necessary, so that a soil-like microflora develops, and blending into the process at different process locations, a greenwaste or greenwastes, preferably ground into small pieces, so that a biological action occurs converting the greenwaste into a soil-like product with improved odor over that of the treated municipal sludge alone or a composted greenwaste alone. This treatment lowers the pH of the mixture and enables subsequent microbial catabolism of unstable organics and further reduces and controls the long term odor of the treated sludge mixture so that the product odor develops a soil-like intensity and prevents the regrowth of pathogenic microorganisms and maintains stability in the sludge mixture. This beneficiating treatment results in a process that accomplishes the degradation and stabilization of the greenwastes faster than previously available by other technologies. This beneficiating treatment of adding the greenwaste will also have the desirable effect of significantly reducing the emission of ammonia nitrogen from the treated sludge product. The resultant bioactive product is useful as a soil substitute or as a fertilizer. A key objective of this invention is to enhance soil-like physical characteristics of the treated product, so that drying and odor control are achieved under conditions that allow the survival of an indigenous or seeded microflora.

The product of this invention has a number of physical, chemical and microbiological properties that make it a unique organic stabilized product. It has better odor characteristics than either alkaline stabilized pasteurized sludge product or leaf compost; microbial stabilization of the leaf organics by the alkaline stabilized pasteurized sludge product microflora and odor adsorption by the alkaline admixture reduce the putrefactive odor often found in leaf compost. High content of stable organics from the leaf compost aids in sorption or masking of the characteristic alkaline stabilized pasteurized sludge product odor. This combination of characteristics makes the product of this invention a superior material to either alkaline stabilized pasteurized sludge product or leaf compost as a synthetic organic soil substitute or fertilizer.

DETAILED DESCRIPTION OF THE PREFERRED EMBODIMENT

In accordance with the present invention, a method of treating bioorganic or organic and/or wastewater sludge to provide a stable product for use as a beneficial soil or fertilizer for agricultural lands comprising the steps of; treating the bioorganic or organic and/or wastewater sludge with a highly adsorbent material so that odorant sludge organics and inorganics are bound to the adsorbent particles, adjusting the pH so that it is initially above pH 12 for the purpose of creating stress on the microbial pathogens present, adjusting the solids to a minimum of 50%, heating the sludge preferably with an exothermic reaction of the chemical energy contained in the alkaline admixtures in a step hereafter referred to as the "heat pulse step", and treating the sludge with greenwastes.

Figure 1:
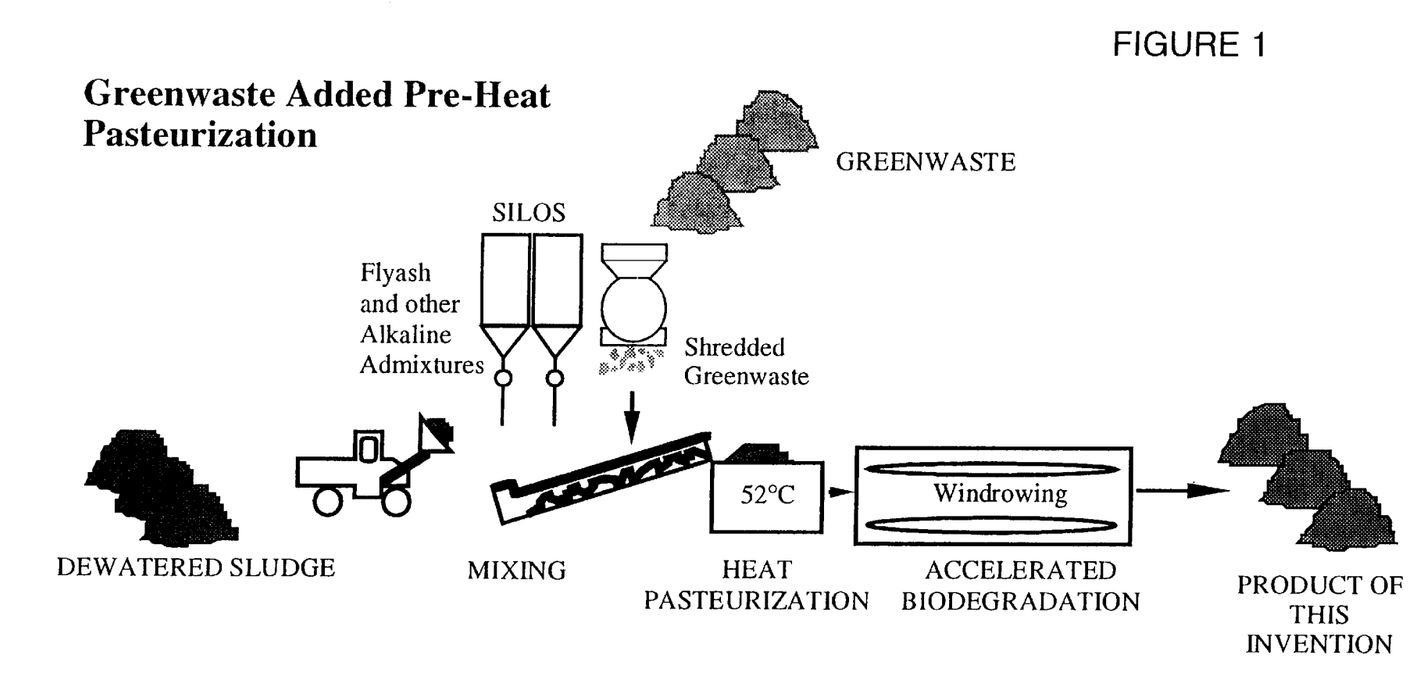
FIG. 1 is a schematic showing the addition of the greenwaste to the sludge processing stream at the time of the initial mixing of the alkaline adsorbant material with the sludge. Also illustrated is the embodiment of grinding or shredding the greenwaste as a means of accelerating the plant tissue degradation.
Figure 2:
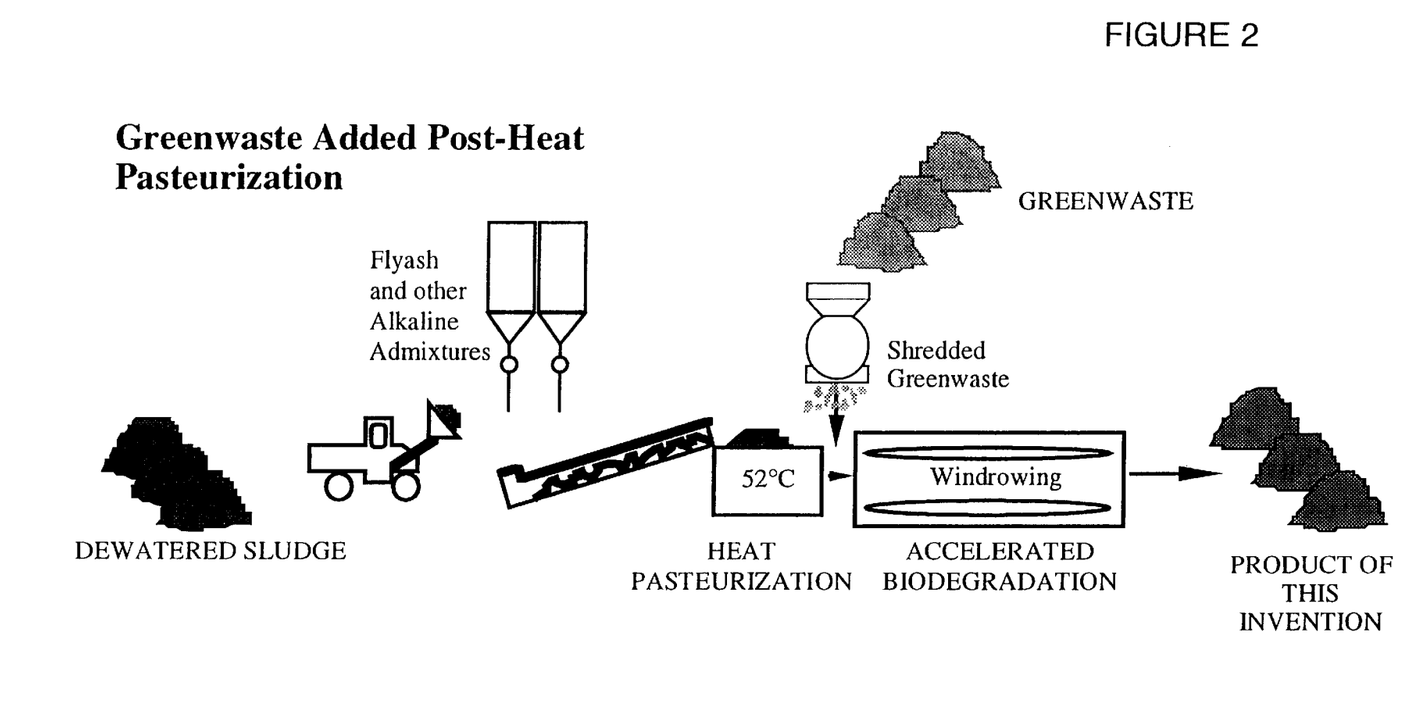
FIG. 2 is a schematic showing the addition of the greenwaste to the sludge processing stream immediately following the completion of the heat pulse step.
Figure 3:
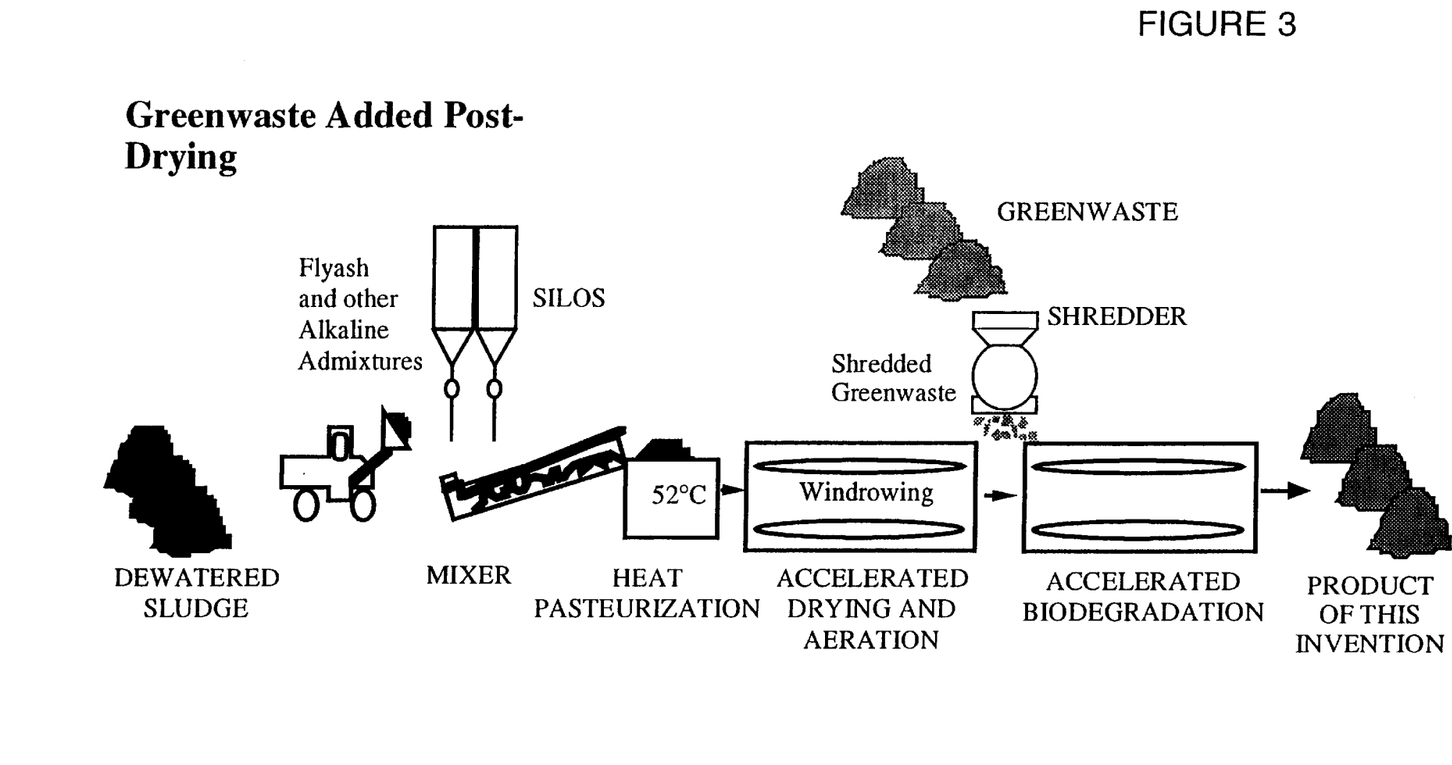
FIG. 3 is a schematic showing the addition of the greenwaste to the sludge processing stream immediately following the completion of the windrowing step for aeration and drying.
Figure 4:
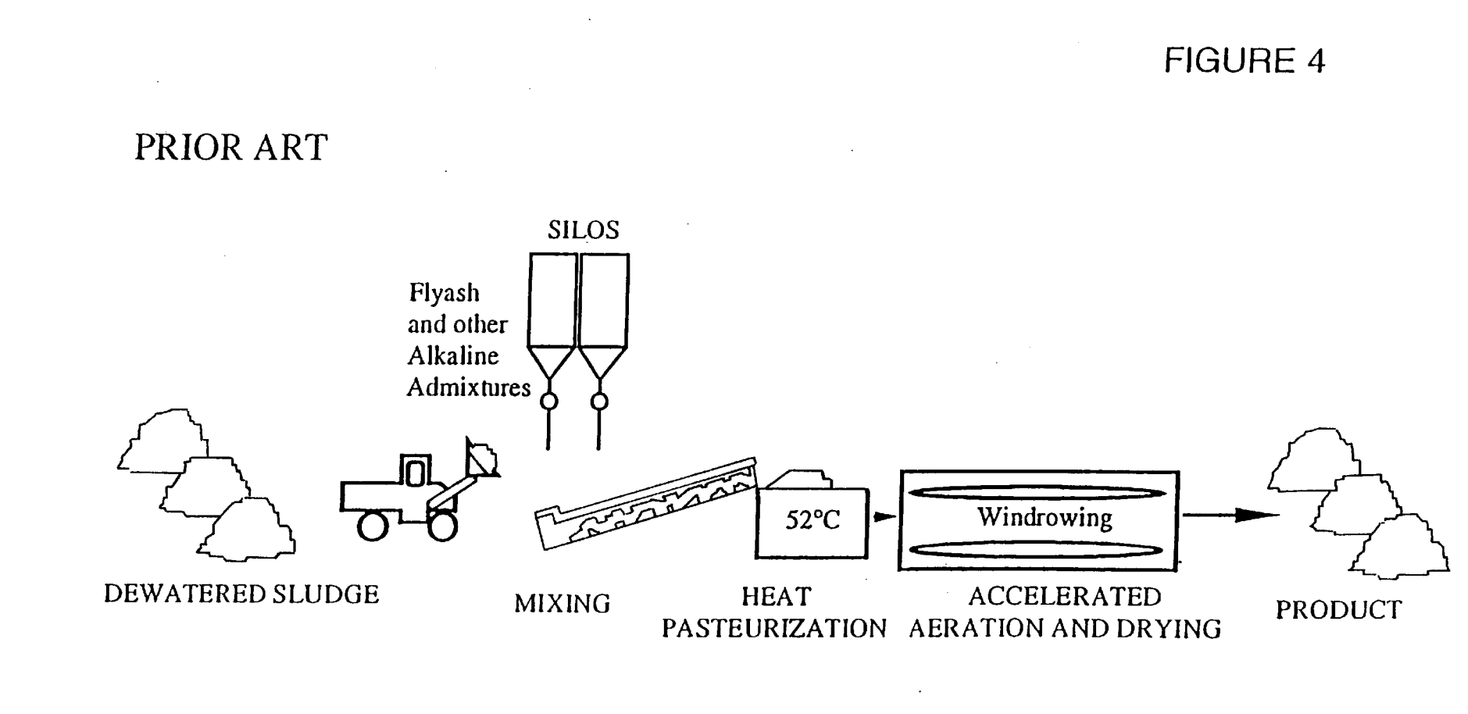
FIG. 4 is a schematic illustrating the production of alkaline stabilized pasteurized sludge product as taught by the prior art in U.S. Pat. Nos. 4,781,842 and 4,902,431.

In accordance with the invention, the greenwastes may be added to the process, (1) along with the alkaline adsorbent material mixed with the sludge in the initial mixing process (FIG. 1); (2) directly to the heat pulse step after the initial mixing of the sludge and alkaline admixture has occurred, such that the greenwaste is subjected to the pasteurization process and ammonia gases, (3) immediately after the heat pulse step such that any residual heat and ammonia is used to partially pasteurize the leaves and begin the plant tissue conditioning process that accelerates microbial decomposition of the plant tissue and sludge organics (FIG. 2) and (3) after completion of or during the windrowing process for the stabilization of the alkaline sludge as per U.S. Pat. Nos. 4,781,842 and 4,902,431 (FIG. 3). The prior art for alkaline stabilization and pasteurization for sludges is illustrated in FIG. 4 as described in U.S. Pat. Nos. 4,781,842 and 4,902,431. The method causes the blending of an alkaline stabilized pasteurized organic, bioorganic or wastewater sludge to green waste in a ratio of between 1:10 and 1:0.5, and optimally at the ratio of 1:4 by volume.

If necessary, because of the absence of a sufficient microflora, the sludge/greenwaste mixture may be treated with a soil or an aged sludge product of this invention or a microbial culture so that the normal microflora of the soil, the sludge product or the culture is seeded directly into the sludge mixture, and the sludge mixture is permitted for a time sufficient to allow the microbial population under influence of the conductivity range to establish and to commence catabolizing the organics present in the sludge, to continue the odor reduction initially begun by the addition of the adsorptive material, to prevent pathogen regrowth, and to continue to carbonate any residual calcium hydroxide or oxide components. The method further optionally includes the steps of treating the sludge mixture with activated carbon to further reduce the odor. The sludge treated may be raw sludge, bioorganic sludge or PSRP or PFRP treated municipal sludge and is preferrably between 15% and 70% solids.

The significance of this invention is that the resultant sludge/greenwaste/mineral product is produced more rapidly than any other method available to date and that it has soil-like properties in that it is granular, has a soil-like odor, has an enhanced useful nitrogen fertilizer value and a microbial population that will facilitate odor control, long term stability, prevention of pathogen regrowth and add fertility value.

The present invention requires that an adsorbent material be mixed into the sludge to bind odorant organics and inorganics from the sludge and/or greenwastes. If this has been previously added as part of an earlier sludge treatment process then no additional adsorbent material need be added.

If such an adsorbent material has not been added or has been added in a manner sufficient that the sludge mixture contains such adsorbent material comprising less than 30% of the wet weight of the sludge then additional adsorbent material must be mixed with the sludge until it equals or exceeds 30% of the wet weight of the sludge. This involves the method of adding adsorbents selected from a list comprised of cement kiln dust, lime kiln dust, fluidized bed ash, lime injected multistage burner ash, dry sulfur scrubbing residue, slag fines, pulverized calcium carbonate, Class C or Class F fly ash, alkaline gypsum, calcium carbonate water purification sludge, alum or a combination thereof, such that the percent solids of the mixture are increased to at least 50% and the pH of the mixture is temporarily raised to pH 12 or higher. It is important to understand that upon the addition of the greenwaste the pH will rapidly fall to between pH 7 and 9.5 due to the buffering capacity of the greenwaste and the microbial metabolism of the organics in the sludge and the greenwaste. In the preferred embodiment of this invention, the greenwaste is shredded and added to the 12 hour heat pasteurization step as described in U.S. Pat. No. 4,902,431. After the pasteurization incubation, the mixture is placed in windrows and aerated. The windrows should be mechanically mixed twice per week until the plant tissue is no longer visible in the product mixture.

If the treated sludge mixture at this point has not granulated following addition of the alkaline admixture as above, it may be processed through a dryer mechanism to remove water, especially if the greenwaste is to be added after the windrowing or mechanical drying is complete. If the sludge was originally not of a PPRP quality it could be heated to sterilization or near sterilization conditions, i.e., above 80 C., eg., as in 85 C., for several minutes by simply increasing the heat input to the dryer medium above to achieve PFRP prior to being further processed for microbial content as per the specifications of Alternative #1 for achieving Class A pathogen levels of the 1993 USEPA 40 CFR part 503 rule and the process of U.S. Pat. No. 5,275,733.

An indigenous microflora surviving a pasteurization process is enhanced by the addition of the greenwastes and will grow to a level which will effect the beneficiating activities of enhancing the carbonation of any residual hydroxides, the catabolism of unstable organics and the ability of this increased microflora population to prevent the regrowth of pathogenic microorganisms. Alternatively, a sterilized sludge mixture that is still deficient in beneficial microorganisms following the addition of the greenwaste must be seeded directly with a soil, the aged soil-like product of this invention, and/or a controlled microbial culture so that the sludge product of this invention will contain an indigenous microflora. This microflora should be within in the range of about $10^6$ to $10^{10}$ aerobic bacteria and about $10^4$ to $10^7$ fungi per gram soil solids and the bacteria added to the sludge mixture are to selected from a list representing the indigenous bacterial and fungal microflora of agricultural soils and wherein the bacteria added may include members of the actinomycete class of bacteria. The mixture will degrade due to the catabolic activity of the microorganisms such that an increase in osmolarity will occur in the mixture. This blending of a greenwaste with alkaline stabilized pasteurized organic or wastewater sludge causes microbial activity which results in a composting maturity defined by the increase of osmolarity in mmhos to a steady state of between 8 and 14 accompanied by a reduction in the C:N ratio to between 10 and 20. Following the aeration and drying steps, the sludge mixture can be matured by incubation under indigenous conditions which allow the odors which emanate from normal greenwaste composting to be controlled by the slow rate of microbial metabolism permitted under the conditions set up by the sequence of steps described for the method.

The final resultant stabilized sludge/greenwaste product should contain greater than 50% solids that has soil-like properties in that it is granular, has a soil-like odor, has an enhanced useful nitrogen fertilizer value over high alkaline treated sludges and a microbial population that will facilitate odor control, long term stability, prevention of pathogen regrowth and increased fertility value.

The product of this invention is neither that of a leaf compost nor an alkaline stabilized pasteurized sludge product alone, but possesses the best properties of both as a synthetic organic soil substitute. Table 1 lists the primary chemical and physical characteristics of the product of this invention. The pH and soluble salts in the product of this invention are lower than that of alkaline stabilized pasteurized sludge products and total N and organic matter contents are higher; The product of this invention is higher in total P and K than leaf compost, is a more uniform product than leaf compost and has higher available water holding capacity than an alkaline stabilized pasteurized sludge product.

This material has a slightly higher bulk density than that produced by the alkaline stabilized sludge products of U.S. Pat. Nos. 4,781,842, and 4,902,431. The total porosity is at the lower end of the range exhibited by these other materials, i.e., 64% by volume. The saturated hydraulic conductivity indicates that the product of this invention has good internal drainage for plant growth. Aggregate stability measurements showed this material to be different from the alkaline admixture sludge blends of these two patents in that there were fewer large aggregates formed with the product of this invention. The product of this invention showed more smaller aggregates particularly in the 0.5–0.25 mm weight fraction again resembling the characteristics of a Hazleton sandy loam (Logan and Harrison, 1994).

TABLE 1

Characteristics of the Product of this Invention.

| Character | Mean* |
| --- | --- |
| Volatile Solids (%) | 13.6 |
| Total Carbon (%) | 8.52 |
| TKN (%) | 0.45 |
| C:N | 18.9:1 |
| Ammonia-N (ug/g) | 383 |
| Nitrate-N (sat. extract (ug/ml) | 67 |
| Calcium Carbonate Equivalent (%) | 29 |
| pH | 8.63 |
| EC (mmho/cm) (1:5 solid/solution) | 8.32 |
| EC (mmho/cm) sat extract | 29.8 |
| P (%) | 0.42 |
| K (%) | 0.29 |
| Ca (%) | 9.97 |
| Mg (%) | 4.08 |
| Fe (%) | 1.58 |
| Trace Elements (ug/g) | |
| As | 15.3 |
| B | 138 |
| Cd | 1 |
| Cu | 71 |
| Cr | 64 |
| Pb | 33 |
| Hg | <1 |
| Mn | 180 |
| Mo | 6.6 |
| Ni | 80 |
| Sel | 0.81 |

TABLE 1-continued

| | | |
|---|---|---|
| Na | | 732 |
| Zn | | 260 |

Physical Properties

| Property | Unit | Measurement |
|---|---|---|
| Solids | (%) | 79 |
| Bulk density | (g/cm$^3$) | 0.96 |
| Particle density | (g/cm$^3$) | 2.66 |
| Porosity | (% by volume) | 64 |
| Moisture Retention Capacity ⅓ Bar | Vol. fraction | 0.35 |
| 15 Bar | (% moisture) | 19 |
| Aggregate stability | | |
| >5 mm | (weight fraction) | 0.11 |
| 5–2 mm | | 0.16 |
| 2–1 mm | | 0.11 |
| 1–0.5 mm | | 0.09 |
| 0.5–0.25 mm | | 0.30 |
| <.25 mm | | 0.23 |
| Saturated Hydraulic. Conductivity. | (cm/s) | 0.015 |
| Atterberg Limits | | |
| Liquid limit | (% moisture) | 54 |
| Plastic limit | (% moisture) | 27 |
| Plasticity index | (% moisture) | 28 |
| Particle size analysis | | |
| >32 mm | (% by weight) | 0.00 |
| 32–25.4 mm | | 0.00 |
| 25.4–19 mm | | 0.00 |
| 19–16 mm | | 0.00 |
| 16–6.35 mm | | 6.11 |
| 6.35–4.7 mm | | 5.74 |
| 4.7–2 mm | | 26.71 |
| <2 mm | | 61.39 |
| 2–1 m | (% of <2 mm fraction) | 25.06 |
| 1–0.5 mm | | 36.43 |
| 0.5–0.25 mm | | 34.76 |
| 0.25–0.1 mm | | 2.76 |
| 0.1–0.074 mm | | 0.09 |
| 0.074–0.05 mm | | 0.02 |
| <0.05 mm | | 0.88 |

*values reported are the mean of duplicate analyses.

EXAMPLE I

A stabilized, pasteurized wastewater sludge product made from a dewatered anaerobically digested sludge cake with fluidized bed ash and quicklime was mixed with either two volumes and four volumes of leaves collected by a municipal collection program. The leaves were mixed together with the sludge product using a scarab windrow mixing machine which created a windrow approximately 4 feet high and about 8 feet wide at the base. Initially the leaves and sludge product were mixed together twice. In samples of the mixed material leaves could be seen interspersed throughout the sludge product with their stems often intact and attached to the leaves. Windrow mixing of the leaf/sludge product mixture was carried out weekly and samples were taken for analysis. After about three weeks the leaf tissue was difficult to discern and the mixture had a very pleasant earthy odor very unlike the odor of the fresh pasteurized stabilized sludge product used to accelerate the leaf degradation. Conductivity analysis showed a steady state was achieved coincident with the disappearance of the leaf tissue.

EXAMPLE II

In this operation, freshly cut grass was combined with alkaline stabilized pasteurized sludge product in a 2:1 volume to volume ratio as illustrated in FIG. 3. This volume ratio represents a mass ratio of 1 pound of grass to 3 pounds of alkaline stabilized sludge product. The alkaline stabilized sludge product had been processed through the heat pulse stage and once-windrowed prior to use for this operation. A 2:1 volume ratio of grass to alkaline sludge product was previously shown to result in rapid lowering of pH of the blend. Previous work had also demonstrated that sufficient greenwaste must be added to generate enough acid-neutralizing power to rapidly shift the pH of the product of this invention to more neutral ranges required for accelerated biodegradation of the greenwaste, i.e., pH 7–9. This work also demonstrated that moisture content needs to be maintained at less than 50% to minimize the chances of the product of this invention becoming anaerobic and producing unwanted odors during the composting phase. The protocol required maintenance of the three treatments at 65%, 60% and 55% solids. The blends were process twice per week to mix, aerate and adjust the moisture content of the windrows. The alkaline stabilized sludge was initially high in pH (>12) with a medium density of microorganisms, i.e., $10^6$/gram dry weight and no detectable human pathogen indicator organisms (fecal coliforms). The grass greenwaste had a large standing crop of microorganisms, i.e., $10^8$/gram dry weight and a detectable number of pathogen indicator organisms, i.e., >$10^5$/gram dry weight. One week after blending these two materials together, none of the treatments showed any remaining human pathogen-indicating organisms. All three treatments showed a gradual rise in total microorganism numbers. All treatments also showed a 3 log increase in gram positive microorganisms. After 7 weeks of processing over 99% of all recoverable organisms were gram positive. At the same time, combined gram negative, fecal streptococci, and fungi represented less than 0.1% of the total microflora indicating a major shift in populations from that found the alkaline stabilized sludge product alone.

Figure 5:
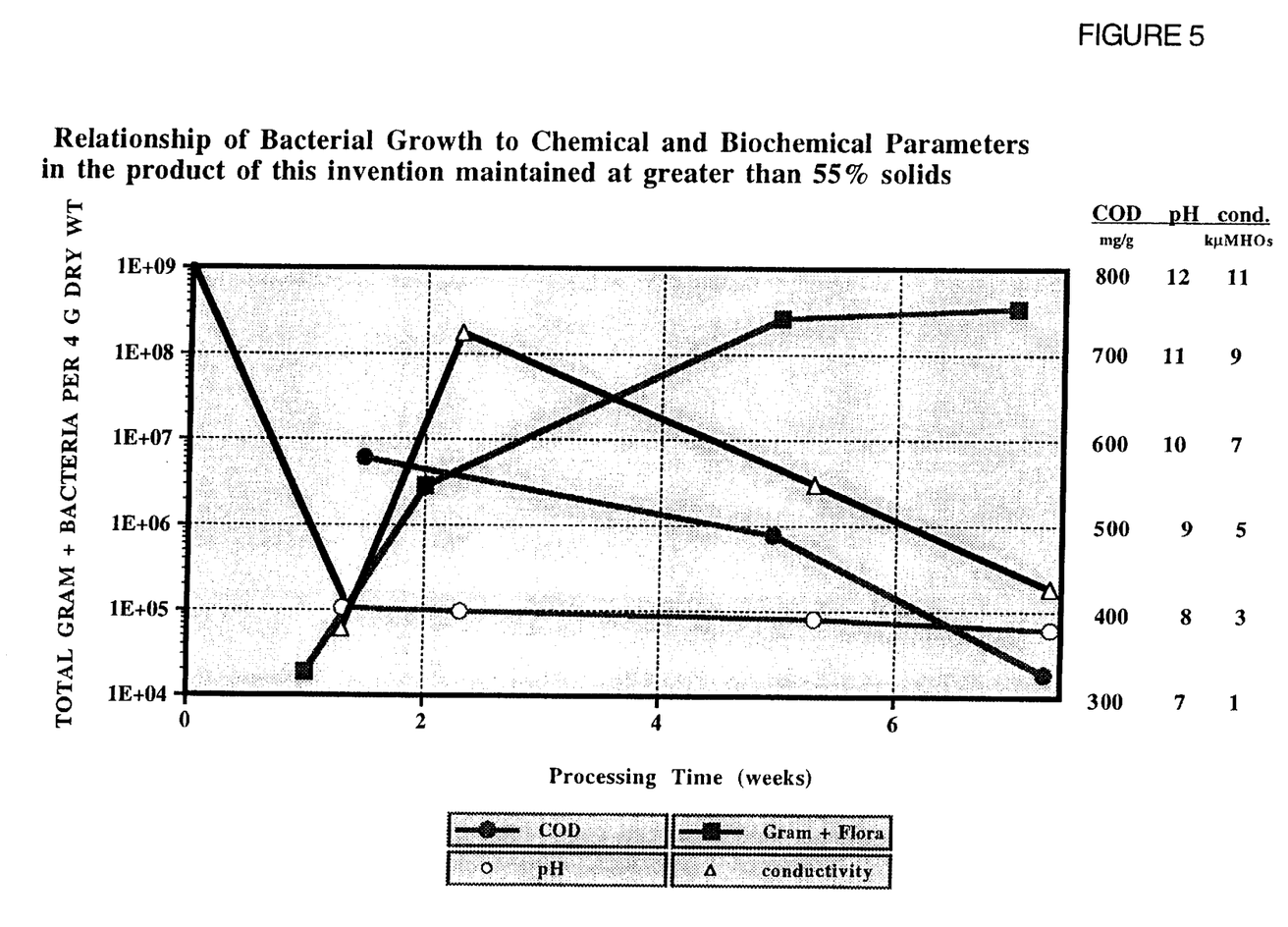
FIG. 5. This figure shows the changes in total aerobic bacterial population numbers over time in coordination with the changes that were measured in the blended product of this invention with regard to pH, conductivity and percent solids.

All three samples underwent a drop in pH over the course of this study. Within two weeks, each treatment was about pH 9.0. Chemical oxygen demand (COD), a measure of available organic carbon, also dropped over the course of the operation for all three samples. The relationship of bacterial growth, as indicated by the rise in gram positive bacteria, to both pH and COD is represented in FIG. 5. It may be inferred from the data that a drop in pH to approximately pH9 is a prerequisite for the initial growth of gram positive bacteria, which, in turn, transform available organic carbon to energy and carbon dioxide. Thus, a gradual drop in COD over time reflects the growth and activity of gram positive bacteria. The dominance of gram positive bacteria over other microbial groups is expected for the optimal environment for the product of this invention which also includes an elevated temperature and about 55% solids. An indication of nutrient availability for microbiological growth is the initial increase in conductivity seen in the 55% solids treatment. This conductivity increase occurs in parallel with the initial log increase in gram positive bacteria and is possible due to the action of bacterial enzymes digesting the greenwaste and releasing nutrients for additional microbial growth. The conductivity increase clearly seen in FIG. 5 (triangles) is followed by a gradual decline over the course of weeks to original levels.

By keeping the percent solids within the 55% to 65% range, the product of this invention never became plastic or nongranular. This allowed for ease of windrowing and more efficient aeration. No septic conditions were detected throughout the course of the mixing and aeration. The grass in each treatment underwent physical transformation in less than three weeks. By that time in the process, the grass tissue was virtually indistinguishable in the blend. The further stabilization of the blends over ensuing weeks in indicated by the continual drop in COD which is a measure of organic carbon available for organism regrowth.

I claim:

1. A method of accelerating composting of greenwaste, comprising vegetative waste including yard waste or agricultural crop remains and either green or woody vegetation remains, while reducing composting odor that comprises the steps of:

(a) providing a greenwaste to be composted, (b) mixing unprocessed wastewater sludge with at least one alkaline material in an amount sufficient to raise the pH of the mixture to 12 or above, (c) heating the mixture of said step (b) to pasteurize the mixture, (d) subjecting the mixture to aeration and drying to stabilize the mixture, (e) blending the greenwaste with the mixture during one of said steps (b), (c) and (d) in an amount in the range of 0.5:1 to 10:1 greenwaste to mixture by volume and (f) composting the blend of the greenwaste and the mixture.

2. The method set forth in claim 1 wherein said amount is 4:1 greenwaste to mixture by volume.

3. The method set forth in claim 1 wherein the sludge comprises a raw primary wastewater sludge, a digested secondary waste-activated or combined wastewater sludge, an organic or bioorganic sludge, or a mixture thereof.

4. The method set forth in claim 1 including the additional step (g) of: controlling microflora in said mixture to accelerate metabolic digestion of organic plant tissue, to inhibit regrowth of pathogenic organisms, to carbonate residual calcium hydroxide or calcium oxide components from said mixture to form a stable product and for sufficient time to allow the greenwaste plant tissue to degrade.

5. The method according to claim 4 wherein said step (g) is accomplished by adding to the mixture of said step (b) a material that contains an indigenous microflora within the range of about $10^5$ to $10^{10}$ aerobic bacteria and about $10^4$ to $10^7$ fungi per gram.

6. The method according to claim 5 wherein the microflora added to the mixture includes bacteria produced in controlled cultures and selected from indigenous bacterial and fungal microflora of agricultural soils.

7. The method according to claim 5 wherein the material added to the mixture is obtained from a stored product resulting from the method of steps (a)–(e).

8. The method according to claim 1 wherein the mixture is heated in said step (c) to a temperature of 85° C. or above for at least several minutes.

9. The method according to claim 1 wherein said step (d) is carried out during or after said step (c).

10. The method set forth in claim 1 wherein ammonia released during sludge stabilization conditions the greenwaste and accelerates microbial decomposition of the greenwaste.

11. The method set forth in claim 1 wherein the greenwaste is at least partially pasteurized by release of heat and ammonia during sludge stabilization.

* * * * *